H. D. Blake,
Furniture Caster.
Nº 20,031. Patented Apr. 27, 1858.

UNITED STATES PATENT OFFICE.

HENRY D. BLAKE, OF NEW HARTFORD, CONNECTICUT.

FURNITURE-CASTER.

Specification of Letters Patent No. 20,031, dated April 27, 1858.

*To all whom it may concern:*

Be it known that I, HENRY D. BLAKE, of New Hartford Center, Connecticut, have invented certain new and useful Improvements in Casters; and I do hereby declare that the following is a full, clear, and exact description of the same, reference being had to the accompanying drawings and to the letters of reference marked thereon.

The nature of my invention consists in securing the spring with the pin and to the horn of the caster for the purpose of working in the groove in the plate and thus keeping the two parts of the caster together as will be hereinafter described.

In order that those skilled in the art may construct and use my invention I will proceed to describe its construction and operation.

Figure 3:
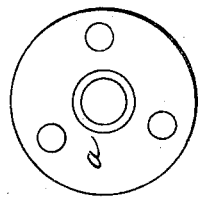
Figure 4:
Figure 2:
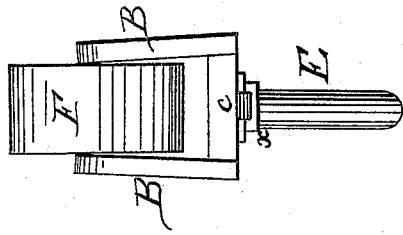
Figure 1:
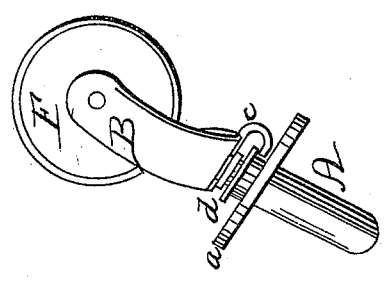

In the accompanying drawings making a part of this specification—Figure 1 is a view of the parts of the caster secured together by means of the pin in the groove. Fig. 2, is a view of the parts of the caster with the plate removed. Fig. 3 is a view of the plate showing the means of attaching it to any desired object. Fig. 4 is a view of the spring.

In the several figures, F, represents the roller of the caster.

B represents the two arms between and to which the roller F, is secured.

E, is a pin secured to the horn of the caster; this pin is provided with a shoulder marked $x$, in Fig. 2.

$c$, is a small spring the form of which will be seen in Figs. 1 and 4,—there being a hole in this spring the pin passes through it and when the pin is secured to the horn, the spring ($c$) is secured also between the shoulder $x$, and the horn. The pin being riveted to the horn the spring ($c$) is of course firmly secured.

A, is the plate of the caster and ($a$) is a flange secured to it or formed on it for the purpose of securing it to any desired object by means of screws or nails.

($d$) is a groove in the plate into which the spring ($c$) enters and in this manner keeps the two parts of the caster together.

In operating this caster the plate A is secured to the object through the flange, or rim ($a$) by means of screws or nails. The pin is then made to enter the plate, the spring ($c$) catching in the groove $d$, and thus sustaining the two parts together. The lower portion may be easily removed by simply pulling it gently, the spring giving and slipping out of the sustaining groove.

I am aware that the spring and groove have been employed before,—a groove being made in the plate or socket tube, the spring secured in it, and catching on the groove made in the pin,—but this is inconvenient and expensive, hence I do not claim the spring or the groove—my claim being confined to the manner of securing and arranging the groove and spring for the purpose of making a cheaper article to the trade; but What I do claim as new and desire to secure by Letters Patent is—

The within described arrangement of the several parts of the caster, constructed and operated in the manner and for the purpose herein fully set forth.

HENRY D. BLAKE.

Witnesses:
JAMES F. HENDERSON,
LUCINA HENDERSON.